(12) United States Patent
Cai et al.

(10) Patent No.: US 12,350,964 B2
(45) Date of Patent: Jul. 8, 2025

(54) WHEEL HUB DRIVING SYSTEM

(71) Applicant: Schaeffler Technologies AG & Co. KG, Herzogenaurach (DE)

(72) Inventors: Xiangyang Cai, Kunshan (CN); Hui Su, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 283 days.

(21) Appl. No.: 18/017,708

(22) PCT Filed: Aug. 7, 2020

(86) PCT No.: PCT/CN2020/107765
§ 371 (c)(1),
(2) Date: Jan. 24, 2023

(87) PCT Pub. No.: WO2022/027574
PCT Pub. Date: Feb. 10, 2022

(65) Prior Publication Data
US 2023/0286317 A1    Sep. 14, 2023

(51) Int. Cl.
*F16H 1/36*    (2006.01)
*B60B 27/04*    (2006.01)

(52) U.S. Cl.
CPC .............. *B60B 27/04* (2013.01); *F16H 1/36* (2013.01)

(58) Field of Classification Search
CPC ...... B60K 7/00; B60K 7/0007; B60K 17/046; B60B 27/0057
USPC ........................................................ 180/65.6
See application file for complete search history.

(56) References Cited

FOREIGN PATENT DOCUMENTS

| | | | |
|---|---|---|---|
| CN | 102648362 | | 8/2012 |
| CN | 104708991 | | 6/2015 |
| CN | 104708991 A | * | 6/2015 |
| CN | 103026103 | | 3/2016 |
| CN | 103328247 | | 10/2016 |
| CN | 106335356 | | 1/2017 |
| CN | 106335356 A | * | 1/2017 |
| CN | 107128162 | | 9/2017 |
| CN | 109109650 | | 1/2019 |
| CN | 106864251 | | 5/2019 |
| CN | 109866607 | | 6/2019 |
| CN | 110576734 | | 12/2019 |
| FR | 2131643 | | 11/1972 |

* cited by examiner

*Primary Examiner* — Derek D Knight
(74) *Attorney, Agent, or Firm* — Volpe Koenig

(57) ABSTRACT

A wheel hub driving system, including a housing, an electric motor, two planetary gear sets and a wheel hub bearing. The wheel hub bearing has a middle axle and an outer ring, the middle axle is fixed relative to the housing, and both a primary sun gear and a secondary sun gear are sleeved around the periphery of the wheel hub bearing. A stator of the electric motor, a primary geared ring and a secondary geared ring are all fixed to the housing. A rotor of the electric motor is anti-torsionally connected to the primary sun gear. A primary planet carrier is anti-torsionally connected to the secondary sun gear, a secondary planet carrier is anti-torsionally connected to the outer ring and the outer ring is configured to be anti-torsionally connected to a wheel rim so as to transmit power from the electric motor to the wheel rim.

19 Claims, 1 Drawing Sheet

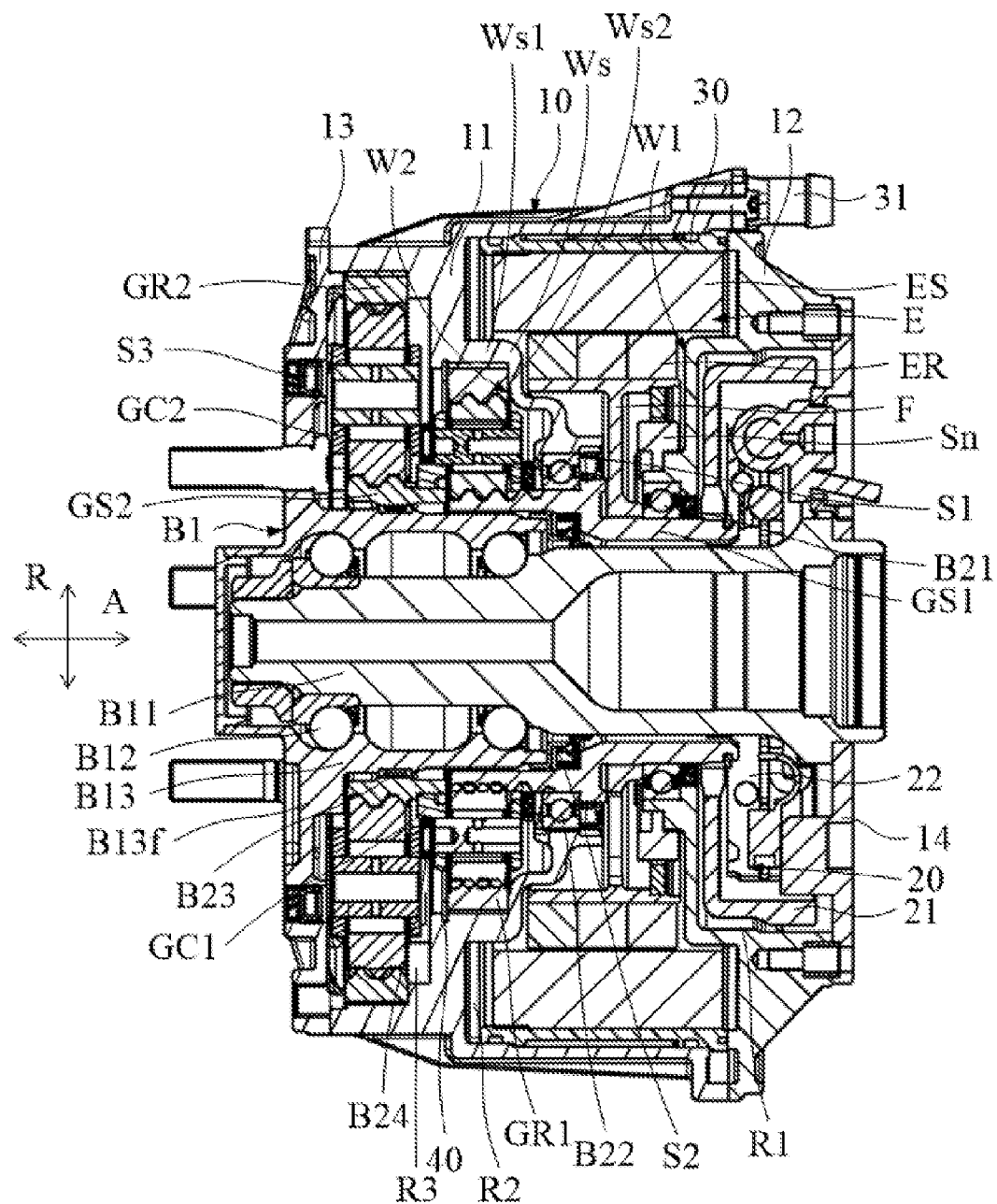

WHEEL HUB DRIVING SYSTEM

CROSS-REFERENCE TO RELATED APPLICATIONS

This application is the U.S. National Phase of PCT Appln. No. PCT/CN2020/107765, filed Aug. 7, 2020, the entire disclosure of which is incorporated by reference herein.

TECHNICAL FIELD

The present disclosure relates to the field of vehicles, and in particular to a wheel hub driving system for a new energy vehicle using hub driving.

BACKGROUND

For a vehicle using an electric drive, especially a heavy-duty vehicle, the drive modes of the vehicle can, for example, be divided into a central motor drive and a hub motor drive.

For a vehicle using a central motor drive, the driving system of the vehicle comprises a central drive motor, a clutch and a reducer that can provide two or three gear ratios. Such a driving system comprises many transmission components and has a long in transmission chain and a large system weight, which will result in large energy loss and low transmission efficiency in the power transmission process.

For a vehicle using a hub motor drive, especially a heavy-duty vehicle, a drive assembly and a brake assembly of the vehicle are usually provided on the inner side of a wheel rim. The drive assembly comprises a drive motor, a planetary gear reducer (usually provided with two stages of planetary gear sets) and a wheel hub bearing.

For example, in Chinese Patent Application No. CN106864251B, Chinese Patent Application No. CN107128162A and Chinese Patent Application No. CN109866607A, a hub driving system using a differential planetary gear reducer is disclosed. As two planetary gear sets of the reducer of such a hub driving system are differential, or the two planetary gear sets share the same geared rings, coupled design must be performed for the gears involved in transmission. It is difficult to design and manufacture the planetary gear reducer in a modular manner, and the assembly of components is complicated.

For example, in Chinese Patent Application No. CN103328247A, Chinese Patent Application No. CN103026103A and Chinese Patent Application No. CN102648362A, a wheel hub driving system using a cycloidal gear reducer is disclosed. However, the manufacturing process of cycloid gears is complicated in manufacturing process, the transmission efficiency is low and the cost is high.

SUMMARY

Objectives of the present disclosure are to overcome or at least alleviate the shortcomings existing in the above-mentioned prior art, and to provide a wheel hub driving system that has a simple structure and large gear ratio.

The present disclosure provides a wheel hub driving system, comprising a housing, an electric motor, two planetary gear sets and a wheel hub bearing, wherein a first planetary gear set comprises a primary sun gear, a primary planet carrier and a primary geared ring; a second planetary gear set comprises a secondary sun gear, a secondary planet carrier and a secondary geared ring; the wheel hub bearing comprises a middle axle, a rolling body and an outer ring; and the middle axle is fixed relative to the housing, wherein both the primary sun gear and the secondary sun gear are sleeved around the periphery of the wheel hub bearing;

a stator of the electric motor, the primary geared ring and the secondary geared ring are all fixed to the housing; a rotor of the electric motor is connected to the primary sun gear in a rotationally-fixed manner; the primary planet carrier is connected to the secondary sun gear in a rotationally-fixed manner; and the secondary planet carrier is connected to the outer ring in a rotationally-fixed manner;

and the outer ring is configured to be connected to a wheel rim in a rotationally-fixed manner so as to transmit power from the electric motor to the wheel rim.

In at least one embodiment, the length of the middle axle in the axial direction is greater than the length of the outer ring in the axial direction, the middle axle passes through the housing, the outer ring is provided at a first end of the middle axle, and a second end of the middle axle is not covered by the outer ring.

In at least one embodiment, one end of the outer ring in the axial direction is provided with a flange portion protruding radially outward of the outer ring, and the flange portion is configured to be connected to the wheel rim.

In at least one embodiment, in the axial direction, the primary sun gear is partially sleeved around the periphery of the outer ring, and partially sleeved around the periphery of an area, not covered by the outer ring, of the middle axle; and the secondary sun gear is sleeved around the periphery of the outer ring.

In at least one embodiment, the wheel hub driving system further comprises a brake device, and the brake device is partially connected to the primary sun gear in a rotationally-fixed manner such that braking torque can be transmitted to the primary sun gear when braking operation is performed.

In at least one embodiment, the brake device is a drum brake device; the brake device comprises a brake drum and a brake pad; the brake drum is connected to the primary sun gear in a rotationally-fixed manner; the brake pad is connected to the housing;

in the non-braking state, the brake pad is not in contact with the brake drum; and in the braking state, the brake pad abuts against the inner circumferential wall of the brake drum.

In at least one embodiment, an inner cavity of the housing is provided with a first partition wall and a second partition wall, both of which have an annular shape, are connected to the inner circumferential wall of the housing, and are spaced apart in the axial direction of the housing, the first partition wall and the second partition wall divide the inner cavity of the housing into three chambers in the axial direction; the three chambers are a brake chamber, an electric motor chamber and a gear chamber, respectively;

the brake device is located in the brake chamber;
the electric motor is located in the electric motor chamber;
the primary planet carrier, the primary geared ring, the secondary sun gear, the secondary planet carrier and the secondary geared ring are located in the gear chamber;
and the primary sun gear passes from the gear chamber through the electric motor chamber to extend to the brake chamber.

In at least one embodiment, the housing comprises an intermediate housing, a first cover, a second cover and a support plate;

the intermediate housing is cylindrical; the two ends of the intermediate housing in the axial direction form open openings; the second partition wall is located at the inner circumferential portion of the intermediate housing;

the first cover and the second cover are mounted at the two ends of the intermediate housing, respectively;

the first partition wall is located at the inner circumferential portion of the first cover;

the support plate is mounted at the end of the first cover away from the first partition wall in the axial direction;

and in the axial direction, an area between the first cover and the first partition wall forms the brake chamber, an area between the first partition wall and the second partition wall forms the electric motor chamber, and an area between the second partition wall and the second cover forms the gear chamber.

In at least one embodiment, a first bearing is provided between the first partition wall and the primary sun gear, and a second bearing is provided between the second partition wall and the primary sun gear.

In at least one embodiment, an annular first seal is provided between the second partition wall and the primary sun gear; the first seal is located on the side of the second bearing close to the first partition wall in the axial direction;

and an annular second seal is provided between the wheel hub bearing and the primary sun gear; and the second seal is located at the end of the outer ring close to the first partition wall in the axial direction.

In at least one embodiment, an annular third seal is provided between the flange portion and the housing.

In at least one embodiment, a third bearing is provided between the secondary sun gear and the outer ring.

In at least one embodiment, a thrust bearing is provided between the primary planet carrier and the secondary planet carrier.

In at least one embodiment, the second partition wall partially forms a stepped shape such that the second partition wall comprises an annular stepped portion; the stepped portion comprises a stepped circumferential wall and a stepped end wall;

an outer circumferential wall of the primary geared ring is connected to the stepped circumferential wall in an interference fit manner; and one end of the primary geared ring abuts against the stepped end wall.

In at least one embodiment, a circlip is provided at the other end of the primary geared ring; and the circlip can prevent the primary geared ring from decoupling from the stepped portion;

an annular groove is provided on the inner circumferential side of the stepped circumferential wall; and the circlip is provided in the annular groove.

The wheel hub driving system according to the present disclosure has a simple structure, and a high degree of modularity and is capable of providing a relatively large gear ratio.

BRIEF DESCRIPTION OF THE DRAWINGS

FIG. 1 shows a section view of a wheel hub driving system according to one embodiment of the present disclosure.

DETAILED DESCRIPTION

Exemplary embodiments of the present disclosure will be described below with reference to the drawings. It should be understood that the specific description is only used to teach those skilled in the art how to implement the present disclosure, and is neither intended to be exhaustive of all possible variations of the present disclosure nor to limit the scope of the present disclosure.

Unless otherwise specified, referring to FIG. 1, A represents the axial direction of a wheel hub driving system, and the axial direction A is consistent with the axial direction of an electric motor E in the wheel hub driving system; and R represents the radial direction of the wheel hub driving system, and the radial direction R is consistent with the radial direction of the electric motor E in the wheel hub driving system.

The wheel hub driving system according to the present disclosure mainly comprises a housing 10, an electric motor E, a rotor support F, two stages of planetary gear sets, a wheel hub bearing B1 and a brake device 20.

A first planetary gear set comprises a primary sun gear GS1, a primary geared ring GR1, a primary planet carrier GC1 and a primary planetary gear; and the second planetary gear set comprises a secondary sun gear GS2, a secondary geared ring GR2, a secondary planet carrier GC2 and a secondary planetary gear.

The wheel hub bearing B1 comprises a middle axle B11, a rolling body B12 and an outer ring B13. The middle axle B11 has a shaft shape, the middle axle B11 passes through the housing 10, the outer ring B13 is sleeved around the periphery of the middle axle B11, the length of the outer ring B13 in the axial direction is smaller than the length of the middle axle B11 in the axial direction, the outer ring B13 is provided close to one end of the housing 10 in the axial direction A, or the outer ring B13 is provided close to one end of the middle axle B11. The end, covered by the outer ring B13, of the middle axle B11 is the first end, and the other end of the middle axle B11 is the second end.

The middle axle B11 is fixedly provided relative to the housing 10, and specifically, the second end of the middle axle B11 is fixed to a support plate 14 of the housing 10 to be described below. The outer ring B13 can rotate relative to the middle axle B11.

The brake device 20 in this embodiment is a drum brake device, which comprises a brake drum 21 and a brake pad 22.

the electric motor E, the wheel hub bearing B1, the primary sun gear GS1, the primary geared ring GR1, the primary planet carrier GC1, the secondary sun gear GS2, the secondary geared ring GR2 and the secondary planet carrier GC2 of the planetary gear sets, and the drum brake device 20 are all provided coaxially.

A stator ES of the electric motor E is fixed to the housing 10, and a rotor ER of the electric motor E is located on the inner circumferential side of the stator ES. Preferably, a cooling jacket 30 is provided between the stator ES and the housing 10, a cooling cavity is formed between the cooling jacket 30 and the inner wall of the housing 10, and the housing 10 is provided with a cooling port 31 in communication with the cooling cavity.

The rotor support F has an approximately annular shape and is anti-torsionally connected to the rotor ER (rotationally-fixed). The rotor support F is configured to transmit torque of the rotor ER to the planetary gear sets.

The primary sun gear GS1 is sleeved around the periphery of the wheel hub bearing B1, and sleeved inside the rotor support F. In the axial direction A, the primary sun gear GS1 is partially sleeved around the periphery of the outer ring B13, and partially sleeved around the periphery of an area, not covered by the outer ring B13, of the middle axle B11. The primary sun gear GS1 is anti-torsionally connected to the rotor support F.

Preferably, in order to support the primary sun gear GS1 well in the radial direction, a first bearing B21 and a second bearing B22 are further provided in the housing 10. The outer ring of the first bearing B21 and the outer ring of the second bearing B22 are anti-torsionally connected to the housing 10, and the inner ring of the first bearing B21 and the inner ring of the second bearing B22 are anti-torsionally connected to the primary sun gear GS1. The first bearing B21 and the second bearing B22 are respectively located on the two sides of a connection region of the rotor support F with the primary sun gear GS1 in the axial direction A.

Specifically, in order to facilitate the mounting of the first bearing B21 and the second bearing B22, and to isolate the electric motor E from other components relatively, two annular partition walls are formed in an inner cavity of the housing 10 (the two partition walls, namely the first partition wall W1 and the second partition wall W2, are described in detail below).

In the present embodiment, the housing 10 is divided into an intermediate housing 11, a first cover 12, a second cover 13 and a support plate 14.

The intermediate housing 11 is cylindrical, and the two ends of the intermediate housing in the axial direction A are provided with open openings.

The first cover 12, the second cover 13 and the support plate 14 all have an annular shape with an opening in the middle.

The first cover 12 and the second cover 13 are respectively fixed and mounted at the openings in the two ends of the intermediate housing 11 by, for example, screws.

The inner circumferential portion of the first cover 12 forms the first partition wall W1, and the axial middle portion of the inner cavity of the intermediate housing 11 forms the second partition wall W2.

The first partition wall W1 is recessed toward the second partition wall W2 in the axial direction A such that a chamber is formed between the axial end of the first cover 12 away from the second cover 13 and the first partition wall W1, and the chamber is configured to house the brake device 20 (further described below). The chamber is hereinafter referred to as the brake chamber R1.

The support plate 14 is fixed to the axial end portion of the first cover 12 away from the second cover 13 by, for example, screws, so that it is also expressed in a way that the brake chamber R1 is formed between the support plate 14 and the first partition wall W1. As described above, the support plate 14 plays a role in supporting the middle axle B11. In addition, a brake actuator and the brake pad 22 of the brake device 20 to be described below are also mounted on the support plate 14. The support plate 14 may be connected to a suspension of a vehicle.

The second partition wall W2 divides the inner cavity of the intermediate housing 11 into two chambers in the axial direction A, the two chambers being the electric motor chamber R2 close to the first partition wall W1 (or the electric motor chamber R2 located between the first partition wall W1 and the second partition wall W2) and the gear chamber R3 close to the second cover 13 (or the gear chamber R3 located between the second partition wall W2 and the second cover 13).

the electric motor E is housed in the electric motor chamber R2, except for the primary sun gear GS1, the two planetary gear sets are both housed in the gear chamber R3, and the primary sun gear GS1 passes from the gear chamber R3 through the electric motor chamber R2 to extend to the brake chamber R1.

The second partition wall W2 has a stepped shape, and the stepped portion Ws of the second partition wall W2 is configured to fix the primary geared ring GR1 to be described below; and meanwhile, the stepped shape also enables the second partition wall W2 to accommodate shapes of various components housed in the housing 10.

The first bearing B21 mentioned above is provided on the inner circumference of the first partition wall W1, and the outer ring of the first bearing B21 is connected to the first partition wall W1 in an interference fit manner; and the second bearing B22 is provided on the inner circumference of the second partition wall W2, and the outer ring of the second bearing B22 is connected to the second partition wall W2 in an interference fit manner.

Preferably, a sensor Sn for measuring the rotational speed of the electric motor E is provided between the first partition wall W1 and the rotor support F; and the sensor Sn is, for example, a resolver, with a stator of the sensor Sn being installed on the first partition wall W1, and a rotor of the sensor Sn being installed on the rotor support F.

The primary geared ring GR1 is fixed to the housing 10, and specifically, the primary geared ring GR1 is fixed to the stepped portion Ws of the second partition wall W2. The stepped portion Ws comprises a stepped circumferential wall Ws1 and a stepped end wall Ws2, the outer circumferential wall of the primary geared ring GR1 is connected to the stepped circumferential wall Ws1 in an interference fit manner, and one end of the primary geared ring GR1 abuts against the stepped end wall Ws2.

The primary planet carrier GC1 is anti-torsionally connected to the secondary sun gear GS2.

The secondary sun gear GS2 is sleeved on the outer ring B13, and the secondary sun gear GS2 and the outer ring B13 can rotate relative to each other; preferably, a third bearing B23 is provided between the secondary sun gear GS2 and the outer ring B13; and more preferably, the third bearing B23 is a needle bearing.

The secondary geared ring GR2 is fixed to the housing 10; and specifically, the secondary geared ring GR2 is anti-torsionally connected to the inner circumferential wall of the intermediate housing 11.

The secondary planet carrier GC2 is anti-torsionally connected to the outer ring B13 of the wheel hub bearing B1; and specifically, the portion of the outer ring B13 close to the second cover 13 in the axial direction A is provided with a flange portion B13$f$ protruding to the outer side in the radial direction R, and the secondary planet carrier GC2 is connected to the flange portion B13$f$.

The flange portion B13$f$ is anti-torsionally connected to a wheel rim (not shown in the FIGURE) by, for example, bolts such that driving torque can be transmitted to the wheel rim.

Preferably, a circlip 40 is provided on the side of the primary geared ring GR1 close to the second cover 13 in the axial direction A, the circlip 40 is fixed in an annular groove formed in the inner wall of the intermediate housing 11, and the circlip 40 may limit the position of the primary geared ring GR1 in the axial direction A and prevent the primary geared ring GR1 from decoupling from the stepped portion Ws.

Preferably, a thrust bearing B24 is provided between the primary planet carrier GC1 and the secondary planet carrier GC2. On one hand, the thrust bearing B24 avoids the direct contact between the primary planet carrier GC1 and the secondary planet carrier GC2 with different rotational speeds; and on the other hand, when helical gears are used in the planetary gear sets, the planet carriers will bear axial force, and at this time the thrust bearing B24 plays a role in supporting the two planet carriers in the axial direction A.

Preferably, an annular first seal S1 is provided between the second partition wall W2 and the primary sun gear GS1, and the first seal S1 is located on the side of the second bearing B22 close to the first partition wall W1 in the axial direction A; an annular second seal S2 is provided between the wheel hub bearing B1 and the primary sun gear GS1, and the second seal S2 is located at the end of the outer ring B13 close to the first partition wall W1 in the axial direction A; and an annular third seal S3 is provided between the flange portion B13f of the outer ring B13 and the second cover 13. The three seals mentioned above isolate the gear chamber R3 from the surrounding space in a sealed manner such that leakage of lubricant from the gear chamber R3 can be prevented, and contaminants can be prevented from entering the gear chamber R3.

The brake device 20 is located in the brake chamber R1, the brake drum 21 is anti-torsionally connected to the primary sun gear GS1, and the brake pad 22 is connected to the support plate 14. When the braking operation is performed, the brake pad 22 is pressed against the inner wall of the brake drum 21, and the brake pad 22 creates friction with the brake drum 21 such that the brake drum 21 is decelerated or even stopped.

Next, a transmission path of torque (or power) of the wheel hub driving system according to the present disclosure in the transmission and braking process is introduced, wherein braking of the wheel hub driving system comprises the braking of the electric motor E itself and mechanical braking using the brake device 20.

(i) Power Transmission Path Through which the Electric Motor E Performs Driving

When the electric motor E drives the wheel rim to rotate, the transmission path of the rotational torque is as follows: from the rotor ER, the rotor support F, the primary sun gear GS1, the primary planetary gear, the primary planet carrier GC1, the secondary sun gear GS2, the secondary planetary gear, the secondary planet carrier GC2, and the outer ring B13 to the wheel rim.

(ii) Power Transmission Path Through which the Electric Motor E Performs Braking When the electric motor E performs braking, the transmission path of the braking torque is as follows: from the rotor ER, the rotor support F, the primary sun gear GS1, the primary planetary gear, the primary planet carrier GC1, the secondary sun gear GS2, the secondary planetary gear, the secondary planet carrier GC2, and the outer ring B13 to the wheel rim.

(iii) Power Transmission Path Through which the Brake Device 20 Performs Braking.

When the brake device 20 performs braking, the transmission path of the braking torque is as follows: from the brake drum 21, the primary sun gear GS1, the primary planetary gear, the primary planet carrier GC1, the secondary sun gear GS2, the secondary planetary gear, the secondary planet carrier GC2, and the outer ring B13 to the wheel rim.

Some of the beneficial effects of the above embodiments of the present disclosure are briefly described hereinafter.

(i) The wheel hub driving system according to the present disclosure has a simple structure, a short transmission chain and high transmission efficiency.

(ii) Two stages of planetary gear sets are used in the present disclosure such that a larger gear ratio can be achieved; and the two planetary gear sets are connected with each other in series, and the size and structure of each planetary gear set can be performed independently, and this falls under the heading of a decoupled design. When different speed ratios must be provided for different applications, the design can be adjusted by just changing the size and structure of one of the planetary gear sets. Compared to differentially-connected planetary gear sets, modular design can be achieved more easily by the planetary gear sets according to the present disclosure.

(iii) The brake device 20 of the present disclosure is anti-torsionally connected to the input end of the planetary gear sets (i.e., the primary sun gear GS1), and the braking torque of the brake device 20 may be amplified by the planetary gear sets. Compared to the common way of, for example, connecting the brake device directly with a wheel, the brake device 20 of the wheel hub driving system according to the present disclosure can meet the braking requirement of the vehicle simply with a small braking torque, and accordingly the size and weight of the brake device may be reduced.

(iv) The first partition wall W1 and the second partition wall W2 are formed in the inner cavity of the housing 10. In this way, the connection and positioning of various components are facilitated; and additionally, the inner cavity of the housing 10 is divided into three chambers such that heat generated in the rotating process of the electric motor E and heat generated in the braking process of the brake device 20 are not easily transferred to other components.

It should be understood that the foregoing embodiments are exemplary only and are not intended to limit the present disclosure. Those skilled in the art can make various modifications and changes to the foregoing embodiments according to the teaching of the present disclosure without departing from the scope of the present disclosure.

DESCRIPTION OF REFERENCE NUMERALS 10. housing; 11. intermediate housing; 12. first cover; 13. second cover; 14 support plate;

W1. first partition wall; W2. second partition wall; Ws. stepped portion; Ws1. stepped circumferential wall; Ws2. stepped end wall;

20. brake device; 21. brake drum; 22. brake pad;

30. cooling jacket; 31. cooling port; 40. circlip;

E. electric motor; ES. stator; ER. rotor; F. rotor support;

GS1. primary sun gear; GR1. primary geared ring; GC1. primary planet carrier;

GS2. secondary sun gear; GR2. secondary geared ring; GC2. secondary planet carrier;

B1. wheel hub bearing; B11. middle axle; B12. rolling body; B13. outer ring; B13f. flange portion;

B21. first bearing; B22. second bearing; B23. third bearing; B24. thrust bearing;

R1. brake chamber; R2. electric motor chamber; R3. gear chamber;

S1. first seal; S2. second seal; S3. third seal; and Sn. sensor.

The invention claimed is:

1. A wheel hub driving system, comprising;

a housing;

an electric motor;

a wheel hub bearing;

a first planetary gear set comprising a primary sun gear, a primary planet carrier and a primary geared ring;

a second planetary gear set comprising a secondary sun gear, a secondary planet carrier and a secondary geared ring;

the wheel hub bearing comprises a middle axle, a rolling body and an outer ring, and the middle axle is fixed relative to the housing;

both the primary sun gear and the secondary sun gear are sleeved around a periphery of the wheel hub bearing;

a stator of the electric motor, the primary geared ring and the secondary geared ring are all fixed to the housing;

a rotor of the electric motor is connected to the primary sun gear in a rotationally-fixed manner;

the primary planet carrier is connected to the secondary sun gear in a rotationally-fixed manner;

the secondary planet carrier is connected to the outer ring in a rotationally-fixed manner, and a thrust bearing is positioned between the primary planet carrier and the secondary planet carrier; and the outer ring is configured to be connected to a wheel rim in a rotationally-fixed manner so as to transmit power from the electric motor to the wheel rim.

2. The wheel hub driving system according to claim 1, wherein a length of the middle axle in an axial direction is greater than a length of the outer ring in the axial direction, the middle axle passes through the housing, the outer ring is provided at a first end of the middle axle, and a second end of the middle axle is not covered by the outer ring.

3. The wheel hub driving system according to claim 2, wherein one end of the outer ring in the axial direction is provided with a flange portion protruding radially outward of the outer ring, and the flange portion is configured to be connected to the wheel rim.

4. The wheel hub driving system according to claim 2, wherein in the axial direction, the primary sun gear is partially sleeved around a periphery of the outer ring, and partially sleeved around a periphery of an area, not covered by the outer ring, of the middle axle, and the secondary sun gear is sleeved around the periphery of the outer ring.

5. The wheel hub driving system according to claim 1, further comprising a brake device partially connected to the primary sun gear in a rotationally-fixed manner such that braking torque is transmittable to the primary sun gear when a braking operation is performed.

6. The wheel hub driving system according to claim 5, wherein the brake device is a drum brake device and comprises a brake drum and a brake pad, the brake drum is connected to the primary sun gear in a rotationally-fixed manner, and the brake pad is connected to the housing; and in a non-braking state, the brake pad is not in contact with the brake drum, and in a braking state, the brake pad abuts against an inner circumferential wall of the brake drum.

7. The wheel hub driving system according to claim 5, wherein an inner cavity of the housing is provided with a first partition wall and a second partition wall, both the first and the second partition walls of which have an annular shape, are connected to an inner circumferential wall of the housing, and are spaced apart in an axial direction of the housing, the first partition wall and the second partition wall divide the inner cavity of the housing into three chambers in the axial direction, and the three chambers are a brake chamber, an electric motor chamber and a gear chamber, respectively;

the brake device is located in the brake chamber;
the electric motor is located in the electric motor chamber;
the primary planet carrier, the primary geared ring, the secondary sun gear, the secondary planet carrier and the secondary geared ring are located in the gear chamber;

and the primary sun gear passes from the gear chamber through the electric motor chamber to extend to the brake chamber.

8. The wheel hub driving system according to claim 7, wherein the housing comprises an intermediate housing, a first cover, a second cover and a support plate;

the intermediate housing is cylindrical, two ends of the intermediate housing in the axial direction form open openings, the second partition wall is located at an inner circumferential portion of the intermediate housing;

the first cover and the second cover are mounted at the two ends of the intermediate housing, respectively;

the first partition wall is located at an inner circumferential portion of the first cover;

the support plate is mounted at an end of the first cover away from the first partition wall in the axial direction; and in the axial direction, an area between the first cover and the first partition wall forms the brake chamber, an area between the first partition wall and the second partition wall forms the electric motor chamber, and an area between the second partition wall and the second cover forms the gear chamber.

9. The wheel hub driving system according to claim 7, wherein a first bearing is provided between the first partition wall and the primary sun gear, and a second bearing is provided between the second partition wall and the primary sun gear.

10. The wheel hub driving system according to claim 9, further comprising:

an annular first seal between the second partition wall and the primary sun gear, the first seal is located on a side of the second bearing closer to the first partition wall in the axial direction;

an annular second seal between the wheel hub bearing and the primary sun gear, and the second seal is located at an end of the outer ring closer to the first partition wall in the axial direction.

11. The wheel hub driving system according to claim 3, further comprising an annular third seal between the flange portion and the housing.

12. The wheel hub driving system according to claim 3, further comprising a third bearing between the secondary sun gear and the outer ring.

13. The wheel hub driving system according to claim 7, wherein the second partition wall partially forms a stepped shape such that the second partition wall comprises an annular stepped portion, and the stepped portion comprises a stepped circumferential wall and a stepped end wall; and an outer circumferential wall of the primary geared ring is connected to the stepped circumferential wall in an interference fit manner;

and one end of the primary geared ring abuts against the stepped end wall.

14. The wheel hub driving system according to claim 13, further comprising a circlip at an other end of the primary geared ring, the circlip prevents the primary geared ring from decoupling from the stepped portion; and an annular groove is provided on an inner circumferential side of the stepped circumferential wall, the circlip is provided in the annular groove.

15. A wheel hub driving system, comprising:
a housing;
an electric motor;
a wheel hub bearing;

a first planetary gear set comprising a primary sun gear, a primary planet carrier and a primary geared ring, and primary planet gears connected to the primary planet carrier and located between the primary sun gear and the primary ring gear;

a second planetary gear set comprising a secondary sun gear, a secondary planet carrier and a secondary geared ring, and secondary planet gears connected to the secondary planet carrier and located between the secondary sun gear and the secondary ring gear;

the wheel hub bearing comprises a middle axle, a rolling body and an outer ring, and the middle axle is fixed relative to the housing;

both the primary sun gear and the secondary sun gear are sleeved around a periphery of the wheel hub bearing;

a stator of the electric motor, the primary geared ring and the secondary geared ring are all fixed to the housing;

a rotor of the electric motor is connected to the primary sun gear in a rotationally-fixed manner;

the primary planet carrier is connected to the secondary sun gear in a rotationally-fixed manner;

the secondary planet carrier is connected to the outer ring in a rotationally-fixed manner;

and the outer ring is configured to be connected to a wheel rim in a rotationally-fixed manner so as to transmit power from the electric motor to the wheel rim, wherein one end of the outer ring in an axial direction is provided with a flange portion protruding radially outward of the outer ring, and the flange portion is configured to be connected to the wheel rim, and a third bearing is provided between the secondary sun gear and the outer ring.

16. The wheel hub driving system according to claim 15, wherein a length of the middle axle in the axial direction is greater than a length of the outer ring in the axial direction, the middle axle passes through the housing, the outer ring is provided at a first end of the middle axle, and a second end of the middle axle is not covered by the outer ring.

17. The wheel hub driving system according to claim 15, further comprising a brake device connected to the primary sun gear in a rotationally-fixed manner such that braking torque is transmittable to the primary sun gear when a braking operation is performed.

18. A wheel hub driving system, comprising;
a housing;
an electric motor;
a wheel hub bearing;
a first planetary gear set comprising a primary sun gear, a primary planet carrier and a primary geared ring;
a second planetary gear set comprising a secondary sun gear, a secondary planet carrier and a secondary geared ring;
the wheel hub bearing comprises a middle axle, a rolling body, and an outer ring, and the middle axle is fixed relative to the housing, and the middle axle extends through an aperture at an axial end portion of the housing;
both the primary sun gear and the secondary sun gear are sleeved around a periphery of the wheel hub bearing;
a stator of the electric motor, the primary geared ring and the secondary geared ring are all fixed to the housing;
a rotor of the electric motor is connected to the primary sun gear in a rotationally-fixed manner;
the primary planet carrier is connected to the secondary sun gear in a rotationally-fixed manner;
the secondary planet carrier is connected to the outer ring in a rotationally-fixed manner; and
the outer ring is configured to be connected to a wheel rim in a rotationally-fixed manner so as to transmit power from the electric motor to the wheel rim.

19. The wheel hub driving system according to claim 18, further comprising a support plate fixed to the axial end portion of the housing, and the middle axle extends through an aperture within the support plate.

* * * * *